(12) United States Patent
Satterwhite (10) Patent No.: US 9,321,185 B2
(45) Date of Patent: Apr. 26, 2016

(54) PIVOTING WINCH ASSEMBLY FOR A WOOD CHIPPER

(71) Applicant: Altec Industries, Inc., Birmingham, AL (US)

(72) Inventor: Robert Daniel Satterwhite, Oxford, NC (US)

(73) Assignee: Altec Industries, Inc., Birmingham, AL (US)

( * ) Notice: Subject to any disclaimer, the term of this patent is extended or adjusted under 35 U.S.C. 154(b) by 77 days.

(21) Appl. No.: 14/209,435

(22) Filed: Mar. 13, 2014

(65) Prior Publication Data

US 2014/0263775 A1    Sep. 18, 2014

Related U.S. Application Data

(60) Provisional application No. 61/789,089, filed on Mar. 15, 2013.

(51) Int. Cl.
| | |
|---|---|
| *B02C 18/00* | (2006.01) |
| *B27L 11/00* | (2006.01) |
| *A01G 3/00* | (2006.01) |
| *B02C 18/22* | (2006.01) |
| *B66D 1/36* | (2006.01) |
| *B66D 3/00* | (2006.01) |
| *B02C 21/02* | (2006.01) |

(52) U.S. Cl.
CPC ............... *B27L 11/002* (2013.01); *A01G 3/002* (2013.01); *B02C 18/2225* (2013.01); *B66D 1/36* (2013.01); *B66D 3/006* (2013.01); *B02C 21/02* (2013.01)

(58) Field of Classification Search
CPC ... B02C 18/2225; B02C 21/02; B27L 11/002; B66D 3/006; B66D 1/36; A01G 3/002
USPC .......... 241/28, 92, 101.76, 101.763; 144/335, 144/176
See application file for complete search history.

(56) References Cited

U.S. PATENT DOCUMENTS

| | | | | |
|---|---|---|---|---|
| 6,138,932 A | * | 10/2000 | Moore .................... | A01G 3/002 241/101.76 |
| 6,955,310 B1 | * | 10/2005 | Morey ................... | A01G 3/002 144/430 |
| 7,562,837 B2 | * | 7/2009 | Brand .................... | A01G 3/002 241/101.2 |
| 7,819,348 B2 | * | 10/2010 | Bouwers ................ | A01G 3/002 241/101.76 |
| 2009/0095828 A1 | * | 4/2009 | Bouwers ............. | B02C 18/2225 241/64 |
| 2013/0334346 A1 | * | 12/2013 | Morey ................... | B27L 11/00 241/28 |
| 2014/0138464 A1 | * | 5/2014 | Casper ................. | B02C 18/145 241/28 |
| 2015/0102142 A1 | * | 4/2015 | Kennedy ............. | B02C 18/2291 241/25 |

* cited by examiner

*Primary Examiner* — Faye Francis
(74) *Attorney, Agent, or Firm* — Erise IP, P.A.

(57) ABSTRACT

A pivotable winch assembly for a wood chipper includes an attachment bracket permanently connected to the wood chipper, a boom pivotably coupled to the attachment bracket by a pivot pin such that pivoting of the boom helps to manipulate and draw material into the wood chipper, a pivot pin to enable the boom to pivot into a plurality of preferred positions with respect to the wood chipper, and a retention pin for securing the boom into the plurality of preferred positions.

16 Claims, 11 Drawing Sheets

PIVOTING WINCH ASSEMBLY FOR A WOOD CHIPPER

RELATED APPLICATIONS

This non-provisional patent application claims priority benefit, with regard to all common subject matter, of earlier-filed U.S. Provisional Patent Application No. 61/789,089, filed Mar. 15, 2013, and entitled "PIVOTING WINCH ASSEMBLY FOR A CHIPPER." The identified earlier-filed provisional patent application is hereby incorporated by reference in its entirety into the present application.

BACKGROUND

1. Field

Embodiments of the invention relate to wood chippers for chipping wood, brush, and other fibrous material. More particularly, embodiments of the invention related to a winch assembly for a wood chipper pivotable into a plurality of preferred positions with respect to the wood chipper.

2. Related Art

Certain wood chippers have winch assemblies that assist in drawing material to be chipped towards the feed horn located at the rear of the wood chipper. Existing winch assemblies are mounted to the wood chipper in a fixed position. The fixed position limits the usefulness of the winch assembly because the wood chipper must be repositioned when material to be chipped is not directly behind the wood chipper. Even when material to be chipped is directly behind the wood chipper there are additional problems. If the existing wood chipper is positioned along the road, a user must rotate the material to be chipped into alignment with the wood chipper before the fixed winch can pull the wood into the chipper. This takes time and may be dangerous if it places the user into the road or requires the user to fumble with heavy material to be chipped.

SUMMARY

A winch assembly for a wood chipper in accordance with a first embodiment of the invention comprises an attachment bracket permanently coupled to the wood chipper for mounting the other winch assembly components, a boom with a winch for drawing material towards the wood chipper, a pivot pin for pivotably coupling the boom to the attachment bracket, and a retention pin for securing the boom into a plurality of preferred positions with respect to the wood chipper. The wood chipper includes a feed horn for accepting material drawn to the wood chipper, and a major axis from the front of the wood chipper to the rear of the wood chipper and left and right sides to the left and right of the major axis.

A winch assembly for a wood chipper in accordance with a second embodiment of the invention comprises a feed horn for accepting material drawn to the wood chipper, an attachment bracket permanently coupled to the wood chipper, a boom with a winch for drawing material towards the wood chipper, a pivot pin for pivotably coupling the boom to the attachment bracket, and a retention pin for securing the boom into a plurality of preferred positions with respect to the wood chipper. The wood chipper includes a major axis from the front of the wood chipper to the rear of the wood chipper and left and right sides to the left and right of the major axis. The plurality of preferred positions includes the following positions with respect to the wood chipper: the boom parallel to the major axis of the wood chipper and facing the rear of the wood chipper; the boom not parallel to the major axis of the wood chipper and facing the rear and the left side; the boom not parallel to the major axis of the wood chipper and facing the rear and the right side.

A method for drawing material located to the side of the wood chipper to the feed horn in accordance with a third embodiment of the invention comprises the steps of removing the retention pin of the winch assembly, pivoting the boom of the winch assembly such that the boom is facing the rear and the side of the wood chipper, inserting the retention pin into the set of retention openings and one of the plurality of secondary openings of the winch assembly, extending the rope towards the material to be chipped, attaching the rope to the material to be chipper, and retracting the rope such that the material is drawn to the feed horn of the wood chipper. In this embodiment, if the material to be chipped is generally aligned with the major axis of the wood chipper the user would next detach the rope and allow the feed system of the wood chipper to feed the material into the wood chipper.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
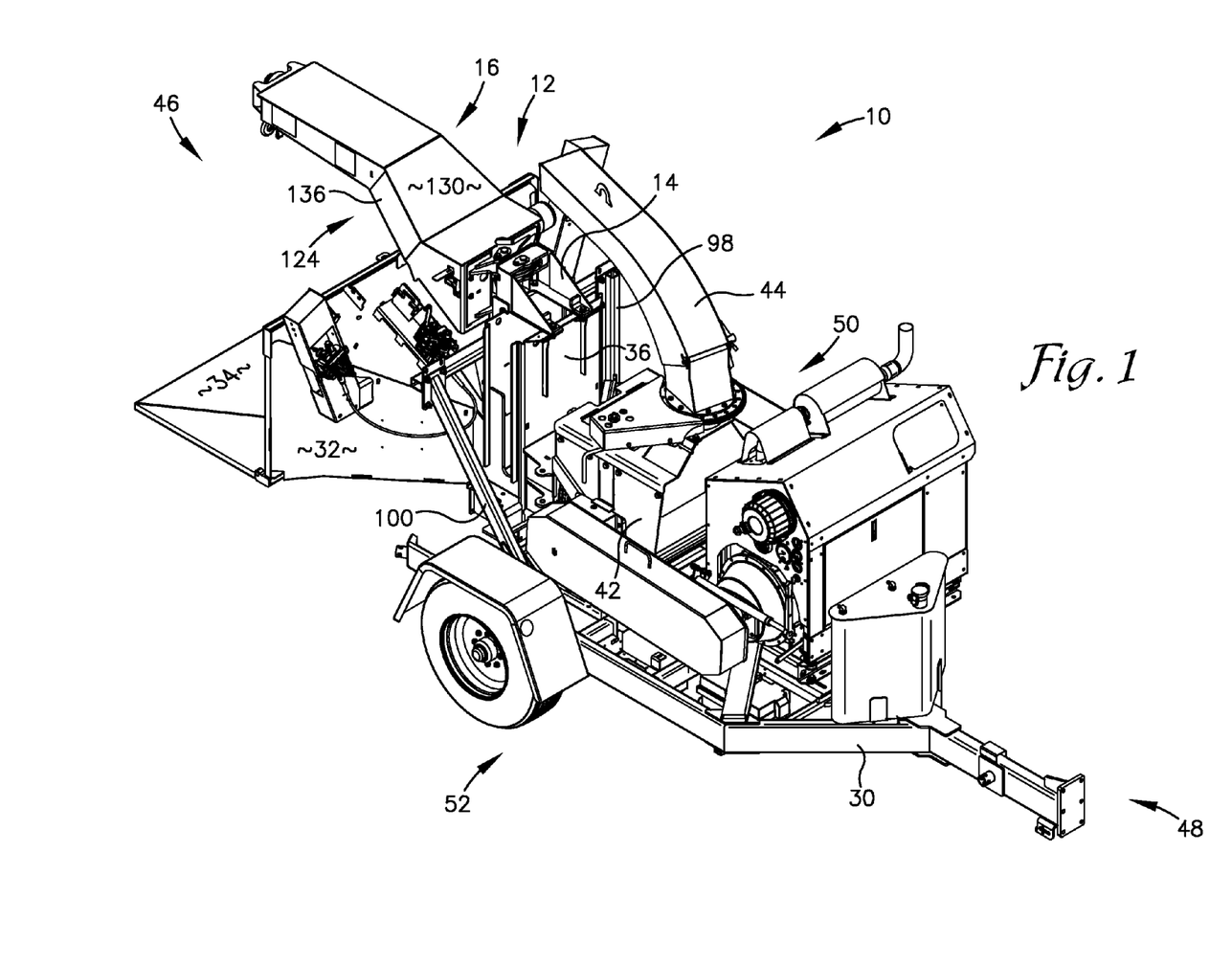
FIG. 1 is a perspective view of a wood chipper in accordance with various embodiments of the invention.
Figure 2:
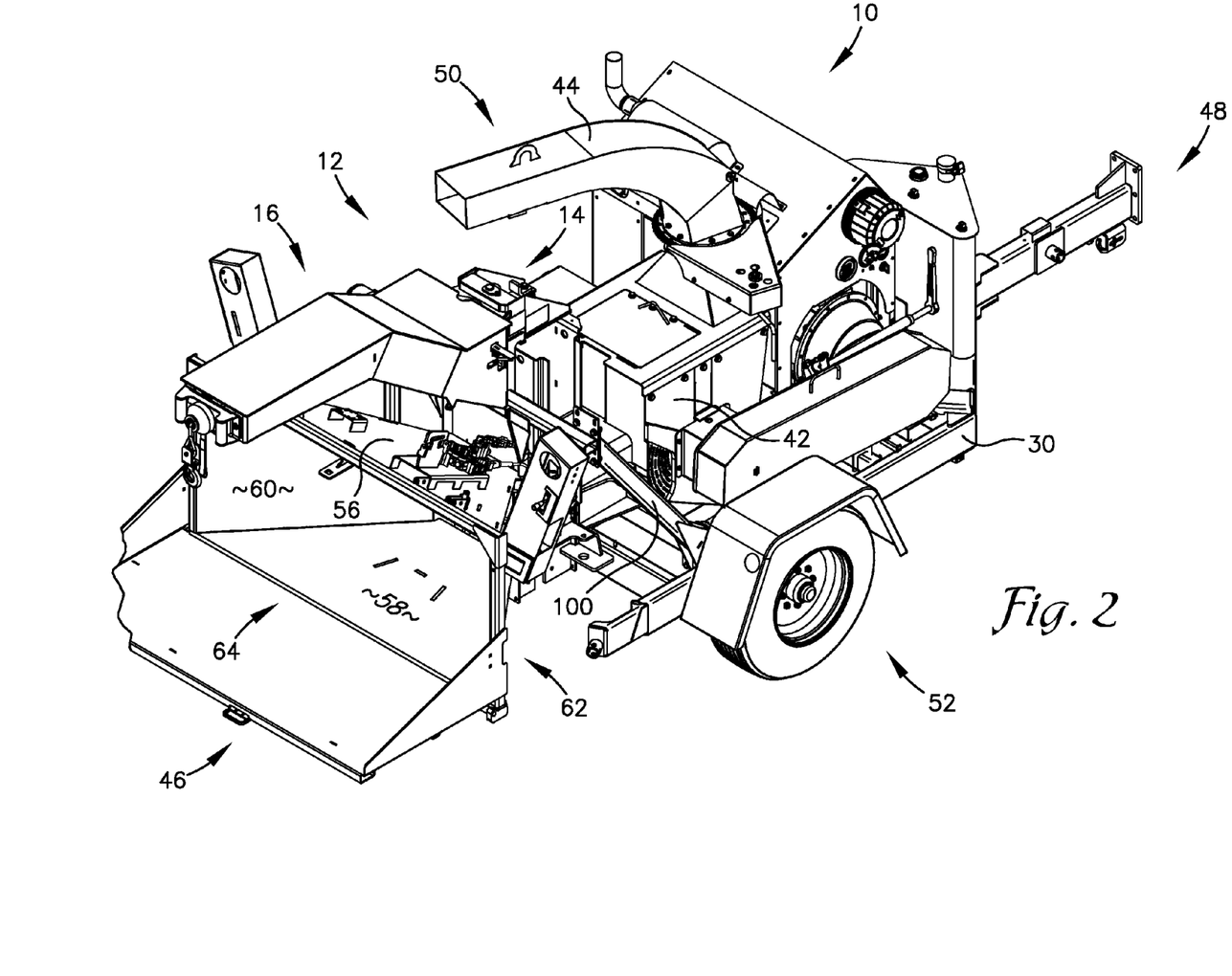
FIG. 2 is a perspective view of the wood chipper as seen from a feed inlet end of the wood chipper.
Figure 9:
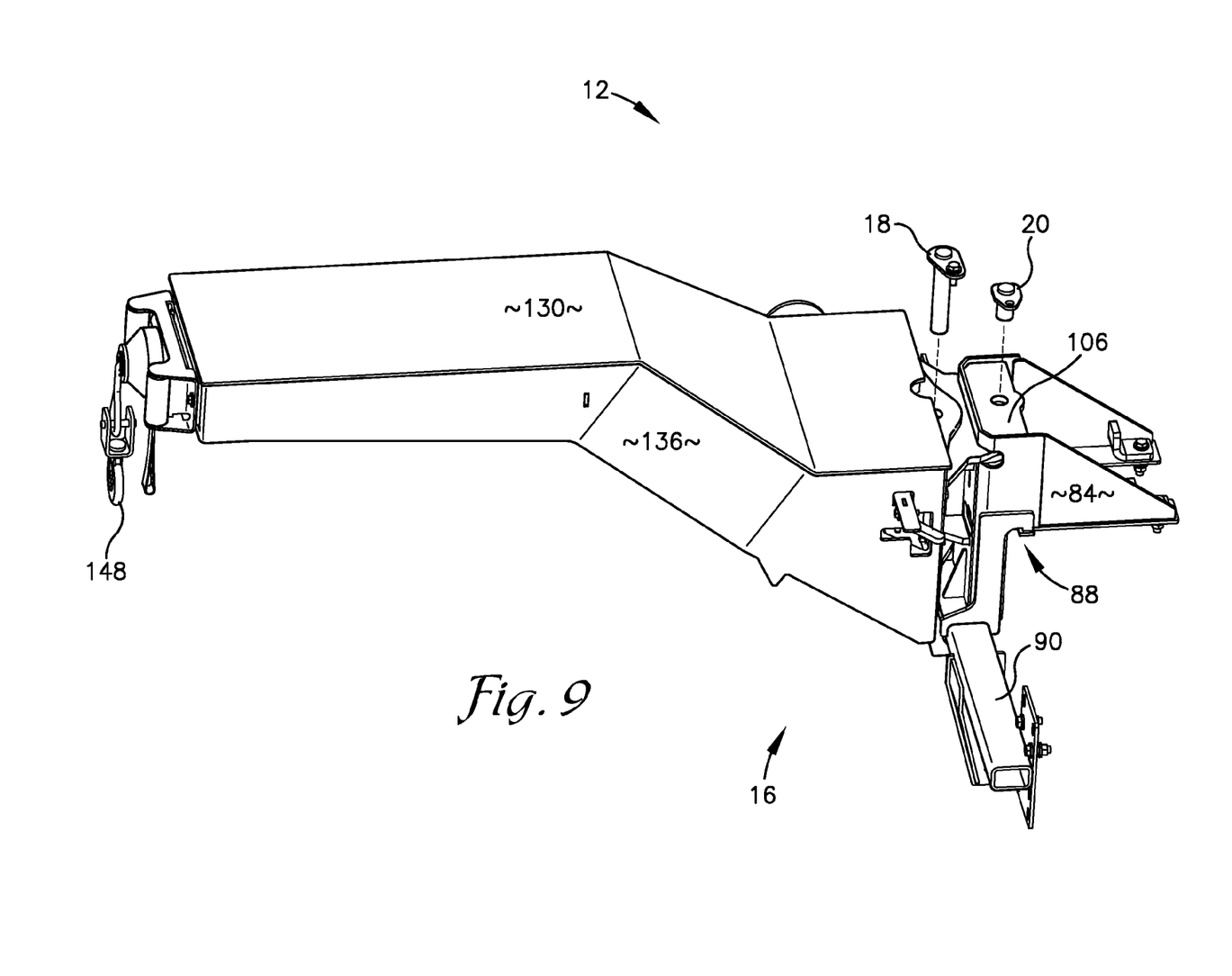
FIG. 9 is an exploded view of a pivoting winch assembly in accordance with various embodiments of the invention.
Figure 10:
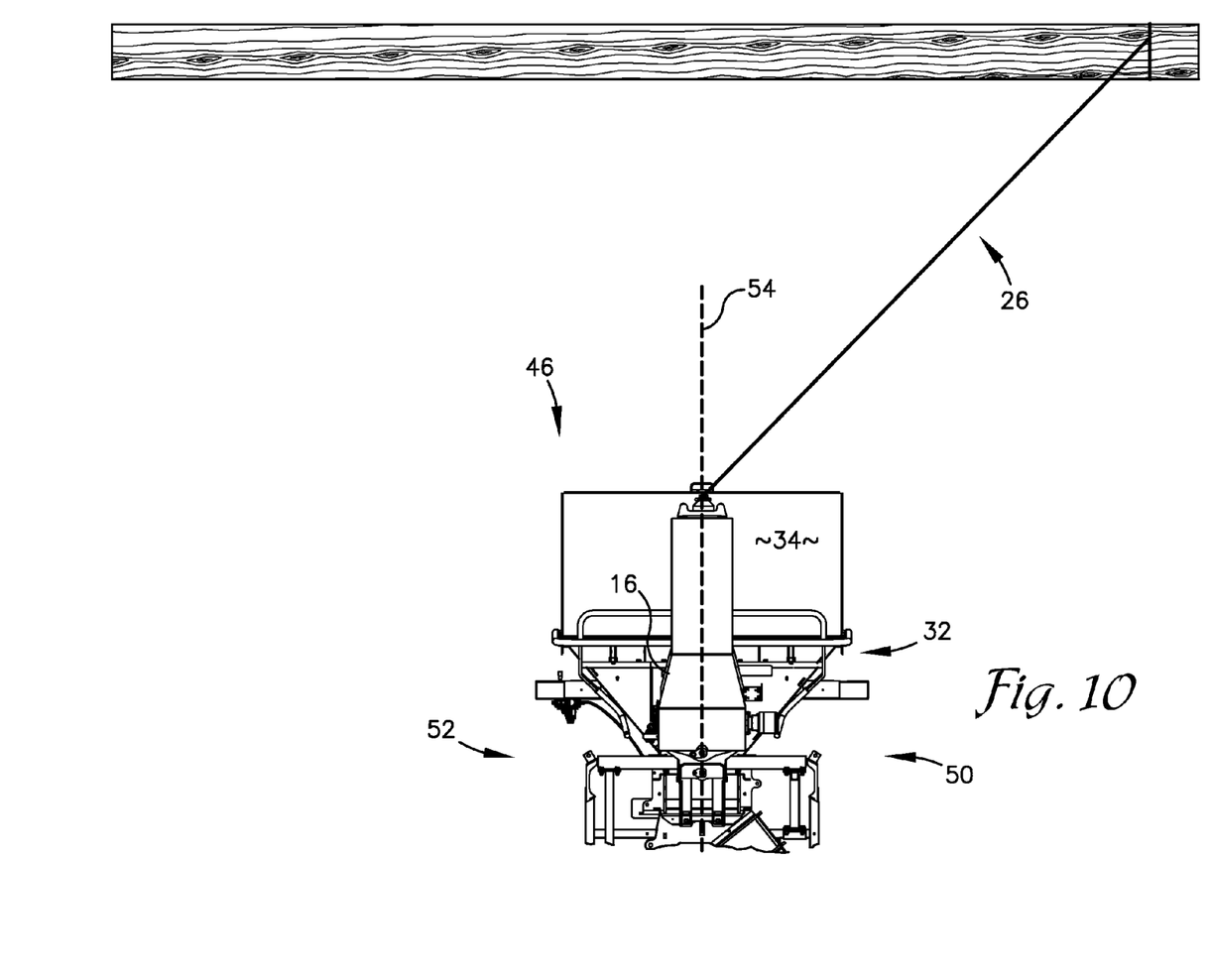
FIG. 10 is a top-down view of the pivoting winch assembly manipulating material to be drawn to the wood chipper.
Figure 11:
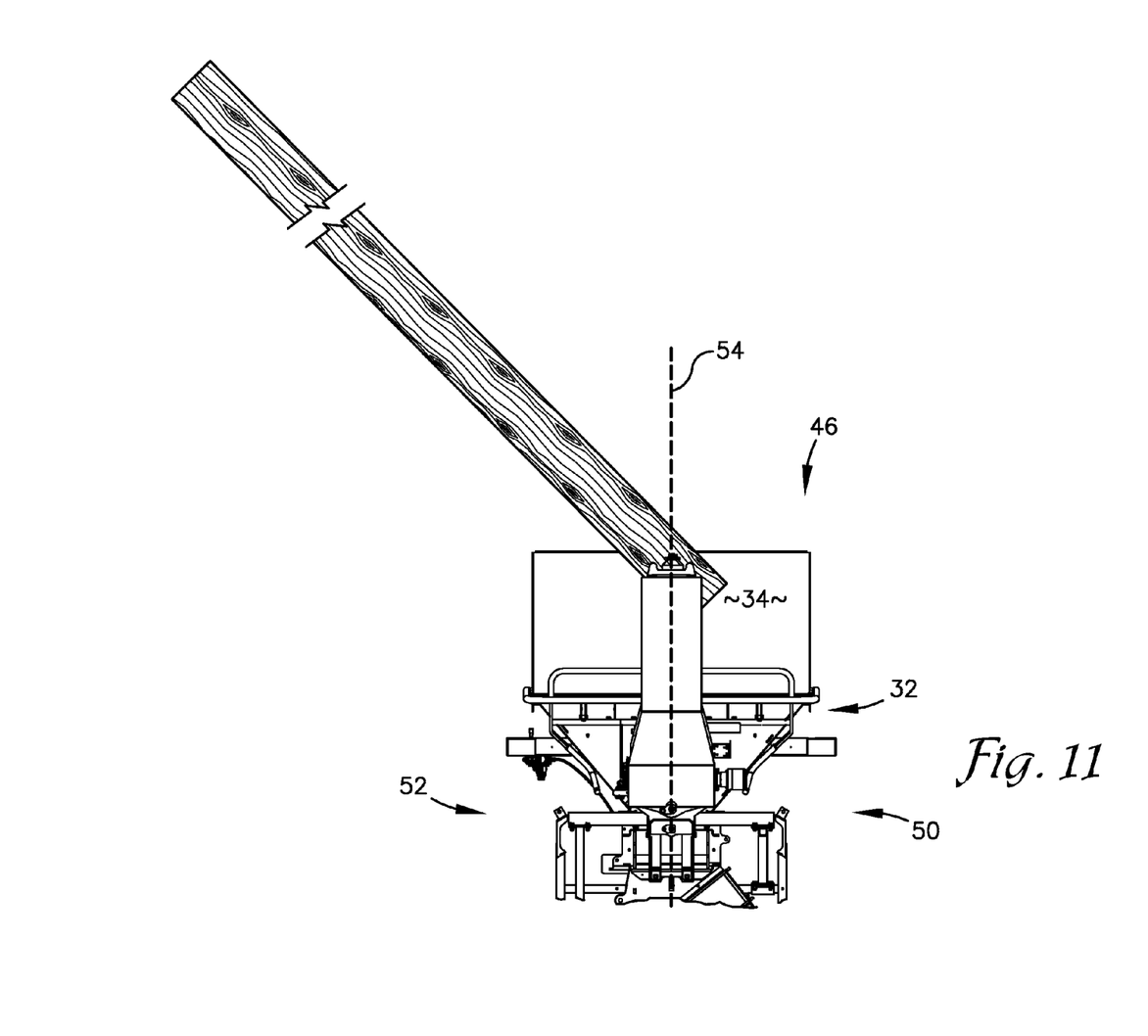
FIG. 11 is a top-down view of the pivoting winch assembly after it has drawn material to the wood chipper.
Figure 12:
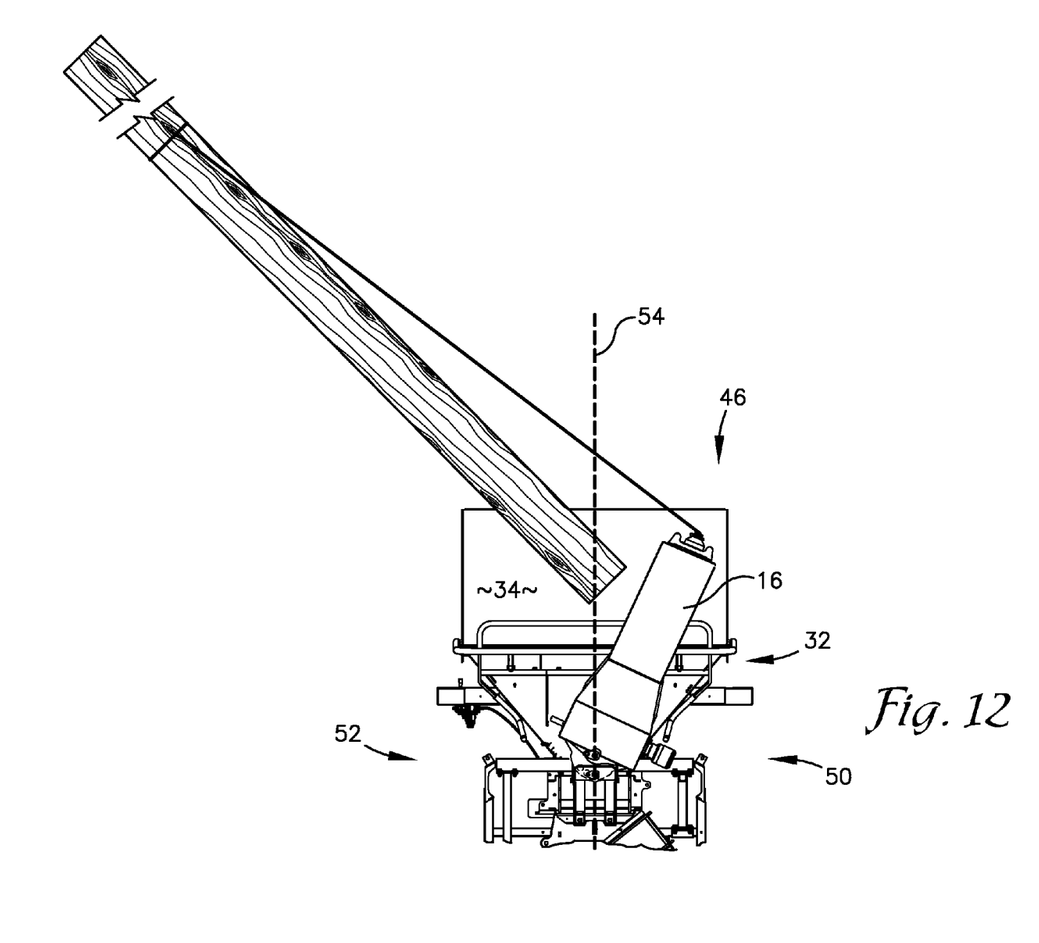
FIG. 12 is a top-down view of the pivoting winch assembly after being pivoted to rotate material generally parallel to the major axis of the wood chipper.
Figure 13:
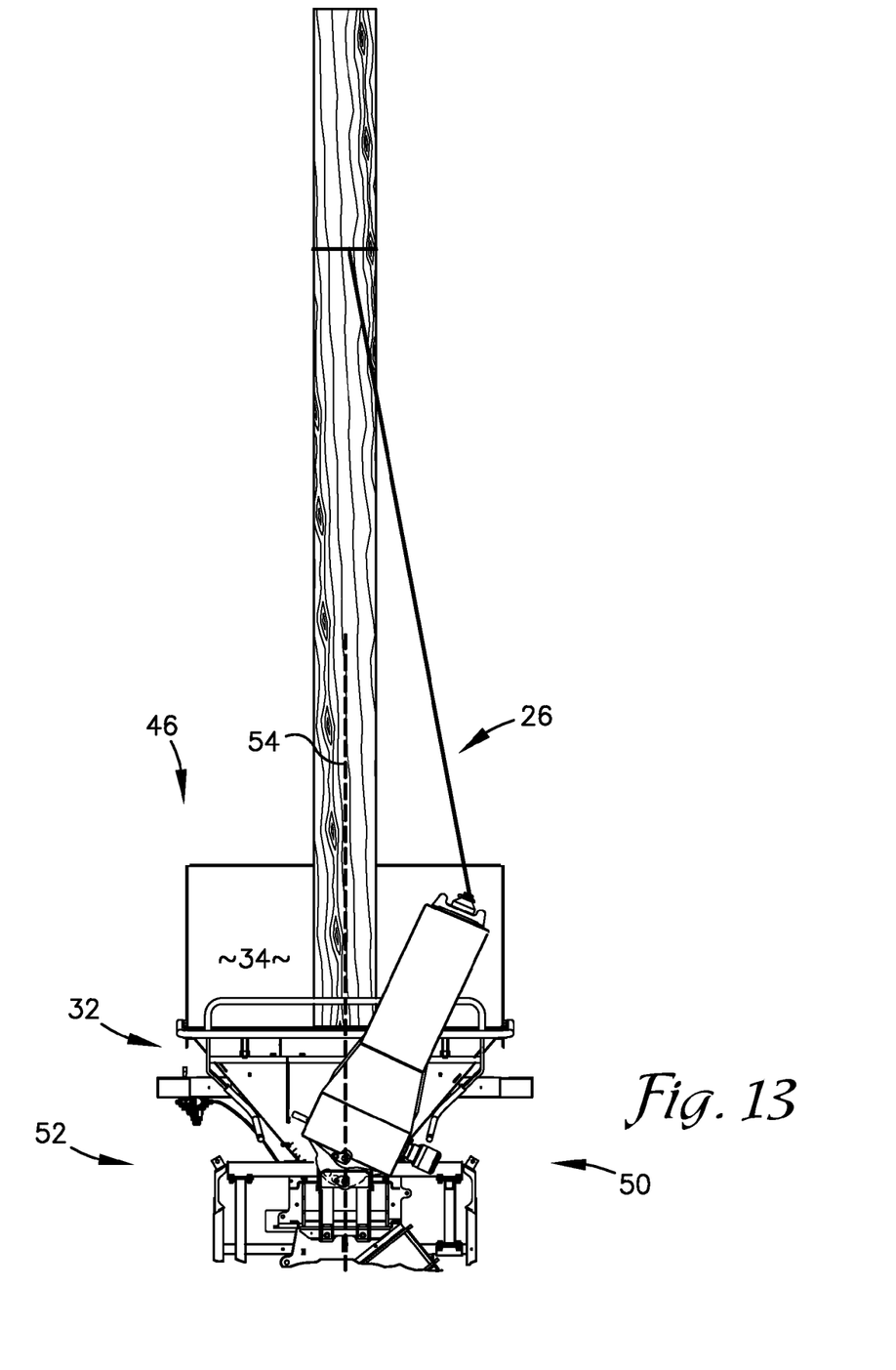
FIG. 13 is a top-down view of the pivoting winch assembly after it has rotated the material.

Turning to the figures, and particularly FIGS. 1, 2, and 9, embodiments of the invention relate to wood chippers 10 (herein also "chippers") for chipping or cutting fibrous material, such as wood and brush. More specifically, embodiments of the invention relate to a pivoting winch assembly 12 to help draw in material to be chipped by the chipper 10. The winch assembly 12 broadly comprises an attachment bracket 14 for mounting the winch assembly, a boom 16 pivotably mounted to the attachment bracket, a pivot pin 18 pivotably coupling the boom and the attachment bracket, and a retention pin 20 for affixing the boom. As will be discussed in more detail later, the pivot pin 18 and the retention pin 20 allow for the boom 16 to be placed into a plurality of preferred positions with respect to the chipper 10. Additionally, the winch assembly 12 may generally include a hydraulic motor 22, a spool 24, a rope 26, and one or more fairleads 28, as will be discussed later.

An illustrative wood chipper 10 is shown in FIGS. 1 and 2, and it should be appreciated that the chipper depicted is an exemplar and other embodiments of the invention may use a wood chipper with a different set of components or in a different configuration from the one shown. The chipper 10 broadly comprises a frame 30 mounting of the other components; a feed horn 32 with an associated feed table 34, the feed horn capable of receipt of material to be chipped; a feed system 36 including associated feed wheels (not depicted) to guide the material to be chipped into the chipper; a chipping mechanism 42 to chip, cut, or otherwise break apart the material; and a discharge chute 44 for dispelling chipped material away from the chipper.

Referring to FIGS. 1 and 2, the wood chipper 10 presents a feed inlet end 46 and a material outlet end 48. The feed inlet end 46 is position proximate the feed horn 32, and the material outlet end 48 is positioned opposite the feed inlet end and proximate the discharge chute 44. Material is fed from a rear of the chipper 10 and exits towards a front of the chipper such that the feed inlet end 46 is the rear and the material outlet end 48 is the front. Left 50 and right sides 52 of the chipper 10 are identified when viewing the chipper from the rear 46, such that the left side is a driver or street side, and the right side is a passenger or curb side when the chipper is being towed by a vehicle.

As described above, the feed horn 32 is proximate the feed inlet end 46 and the rear of the wood chipper 10. Just ahead of the feed horn 32 is the feed system 36 such that as material passes into the feed horn the feed system may receive and draw the material into the chipper 10. Positioned between the feed system 36 and the discharge chute 44 is the chipping mechanism 42. This positioning allows the chipping mechanism 42 to receive material drawn in by the feed system 37 and, after being chipped, propel chipped material out the discharge chute 44. The path that material takes from the feed horn 32 to the feed system 36 onto the chipping mechanism 42 and out the discharge chute 44 is from the rear 46 of the chipper 10 to the front 48 of the chipper. This path from the feed inlet end 46 to the material outlet end 48 is a major axis 54 of the chipper 10.

The feed horn 32 has four sides: a top side 56, a bottom side 58, a left side 60, and a right side 62. The top 56 and bottom sides 58 extend horizontally from the left side 50 to the right side 52 of the wood chipper 10. The left 60 and right sides 62 of the feed horn 32 extend vertically on the left side 50 and the right side 52 of the chipper 10, respectively. The left 60 and right sides 62 intersect the horizontally extending top 56 and bottom side 58 to form a generally quadrilateral-shaped opening 64. The top side 56 is a fixed distance above the frame 30 of the chipper 10. The bottom side 58 is generally horizontal to facilitate material sliding into the feed horn 32 and on into the feed system 36. The four sides taper as the feed horn 32 extends towards the front 48 of the chipper 10 such that the size of the opening 64 at the rear 46 of the chipper is larger than at the feed system 36. This taper guides material to be chipped into the feed system 36. To enter the feed horn 32 material must be fed into the feed horn from the opening 64 at the rear 46 of the chipper 10. Thus material to be chipped is generally aligned with the major axis 54 of the chipper 10 before passing through the feed horn 32.

The feed table 34 is affixed to the bottom side 58 of the feed horn 32 and extends outwards to the rear 46 and away from the feed horn and thus the wood chipper 10. The feed table 34 provides an area for material to rest upon before being drawn into the feed system 36 of the wood chipper 10 either by a user or the winch assembly 12. The feed table 34 also helps horizontally align material before being drawn into the feed system 36. In embodiments of the invention, the feed table 34 is pivotable and can be placed in a vertical position when the wood chipper 10 is not being used such as when the chipper is being transported. The feed table 34 is then pivoted into a horizontal position when the chipper 10 is being used.

Figure 3:
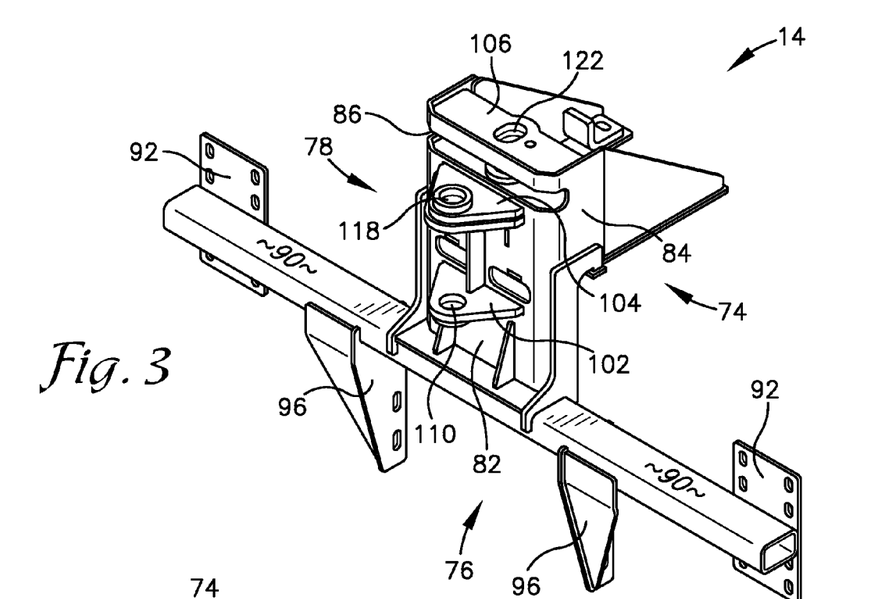
FIG. 3 is a perspective view of an attachment bracket of a pivoting winch assembly of the wood chipper.
Figure 4:
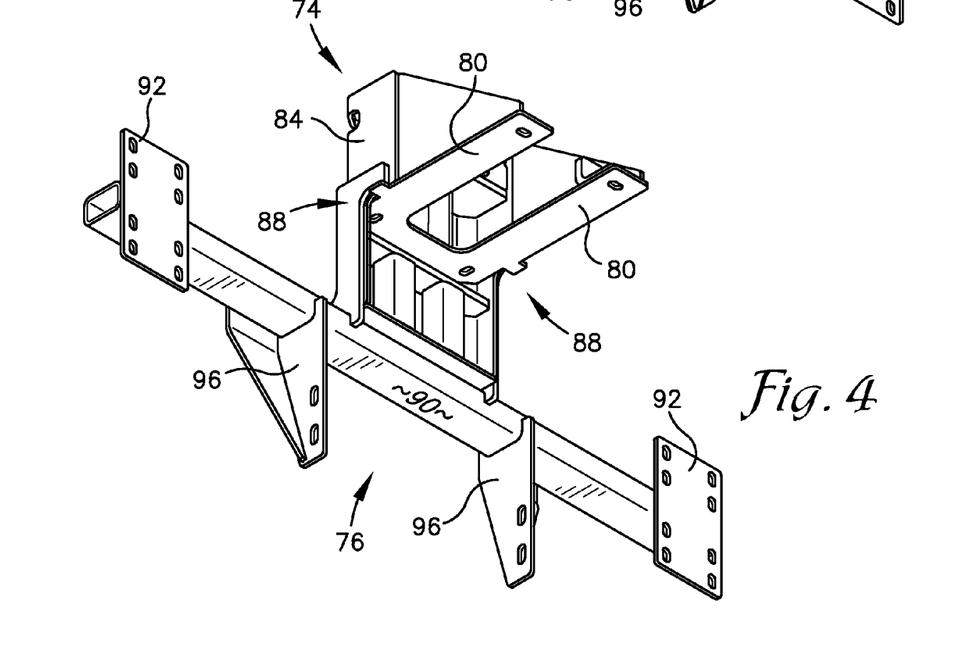
FIG. 4 is a perspective view of the attachment bracket as seen from underneath.

Now turning to FIGS. 3 and 4, the attachment bracket 14 of the winch assembly 12 broadly comprises a trunk 74, a frame support 76, and a boom support 78. The attachment bracket 14 permanently affixes the winch assembly 12 to the wood chipper 10. In embodiments of the invention, the attachment bracket 14 further comprises a feed system support 80 coupled to the feed system 36. The feed system support 80 is a U-shaped flange that is oriented horizontally with its legs extending towards the front 48 of the chipper 10. In other embodiments of the invention, there is only a feed system support 80 and the attachment bracket 14 is not mounted to the chipper 10 by any frame support 76.

The trunk 74 of the attachment bracket 14 is U-shaped with a base 82 and two legs 84. The trunk 74 is oriented such that the legs 84 extend towards the front 48 of the wood chipper 10 and the base 82 faces the rear 46. The trunk 74 extends vertically with the base 82 providing a mounting point for the frame support 76 and the boom support 78 of the attachment bracket 14. The frame support 76 and the boom support 78 are both located on the base 82 of the trunk 74 with the frame support located below the boom support. Above the location of the boom support 78 is a horizontal slot 86 in the base 82 of the trunk 74. The slot 86 provides a place to receive parts of the boom 16 when it is attached to the boom support 78. In embodiments of the invention where the attachment bracket 14 further comprises a feed system support 80, the legs 84 of the trunk 74 partially flare outwards farther towards the front 48 of the chipper 10. In this embodiment each leg 84 of the trunk 74 presents an upside-down L-shaped area 88 permanently affixed to the feed system support 80.

The frame support 76 of the attachment bracket 14 broadly comprises a cross bar 90 attached to the trunk 74, two mounting plates 92 attached to the cross bar, and two support arms attached to the mounting plates. The frame support 76 provides rigidity to the winch assembly 14 and resists flexing when the winch assembly is drawing in material to the wood chipper 10. The cross bar 90 extends horizontally from the left side 50 to the right side 52 of the chipper 10. The cross bar 90 extends further to the left 50 and right sides 52 of the chipper 10 than the rest of the components other than the chipper's frame 30. The middle of the cross bar 90 is permanently mounted to the trunk 74.

Attached to each end of the cross bar 90 are the two mounting plates 92. The mounting plates 92 are flat and extend vertically and horizontally. The mounting plates 92 extend vertically up away from and down in the direction of the wood chipper 10. The mounting plates also extend horizontally in the direction of the left 50 and right sides 52 of the chipper 10. In embodiments of the invention where the attachment bracket 14 further comprises a feed system support 80, there may be additional feed system support arms 96 attached to the cross bar 90 inboard of the mounting plates 92.

Two support arms are attached to the mounting plates 92: the street-side support arm 98 and the curb-side support arm 100. Each support arm is an elongated rigid structure with one end mounted to the frame 30 of the wood chipper 10 and the other end attached to one of the mounting plates 92. The attachment of the support arms may be by way of rivets, nuts and bolts, welding, or any other method of permanent attachment. The street-side support arm 98 is on the left side 50 of the chipper 10 and the curb-side support arm 100 is on the right side 52 of the chipper. In embodiments of the invention the street-side support arm 98 and the curb-side support arm 100 vary in shape to clear the feed system 36 and the chipping mechanism 42 of the chipper 10.

The boom support 78 of the attachment bracket 14 comprises a bottom pivot plate 102, a top pivot plate 104 and a top pivot retention plate 106. In embodiments of the invention, each of the components of the boom support 78 may be strengthened by additional material such as metal components or grommets. The bottom pivot plate 102 is an oblate triangular gusset attached to the base 82 of the trunk 74. The bottom pivot plate 102 extends horizontally reward from the trunk 74 towards the feed inlet end 46 of the chipper 10. The bottom pivot plate 102 is mounted on the trunk 74 above the fixed distance of the feed horn's 32 top side 56. This location is such that any item mounted to the bottom pivot plate 102 would extend over the feed horn 32. Centered in the gusset of the bottom pivot plate 102 is a vertical lower bracket opening 110 for acceptance of the pivot pin 18, as will be discussed later.

The top pivot plate 104 is an oblate triangular gusset integrally connected to a rectangular flange. The top pivot plate 104 is mounted on the trunk 74 above the bottom pivot plate 102 a first distance and just below the slot 86. The top pivot plate 104 also extends from the base 82 of the trunk 74 towards the rear 46 of the wood chipper 10. Centered in the gusset of the top pivot plate 104 is an upper bracket opening 118. The upper bracket opening 118 is directly above lower bracket opening 110 in the bottom pivot plate 102 and vertical for acceptance of the pivot pin 18. The rectangular flange of the top pivot plate 104 extends from the base 82 of the trunk 74 towards the front 48 of the chipper 10 between the legs 84 of the trunk 74. The rectangular flange also extends towards the left 50 and right sides 52 of the chipper 10 to intersect the legs 84 of the trunk 74. Centered in the rectangular flange is a second hole (not depicted). The second hole is vertical for acceptance of the retention pin 20, as will be described later.

The top pivot retention plate 106 is a rectangular flange. The top pivot retention plate 106 is mounted on the trunk 74 just above the slot 86. The top pivot retention plate 106 extends from the base 82 of the trunk 74 towards the front 48 of the wood chipper 10 and above the top pivot plate 104. The top pivot retention plate 106 also extends toward the left 50 and right sides 52 of the chipper 10 to intersect the legs 84 of the trunk 74. Centered in the rectangular flange and just above the second hole of the top pivot plate 104 is a hole 122 in the top pivot retention plate 106. The hole 122 of the top pivot retention plate 106 is vertical for acceptance of the retention pin 20.

Figure 5:
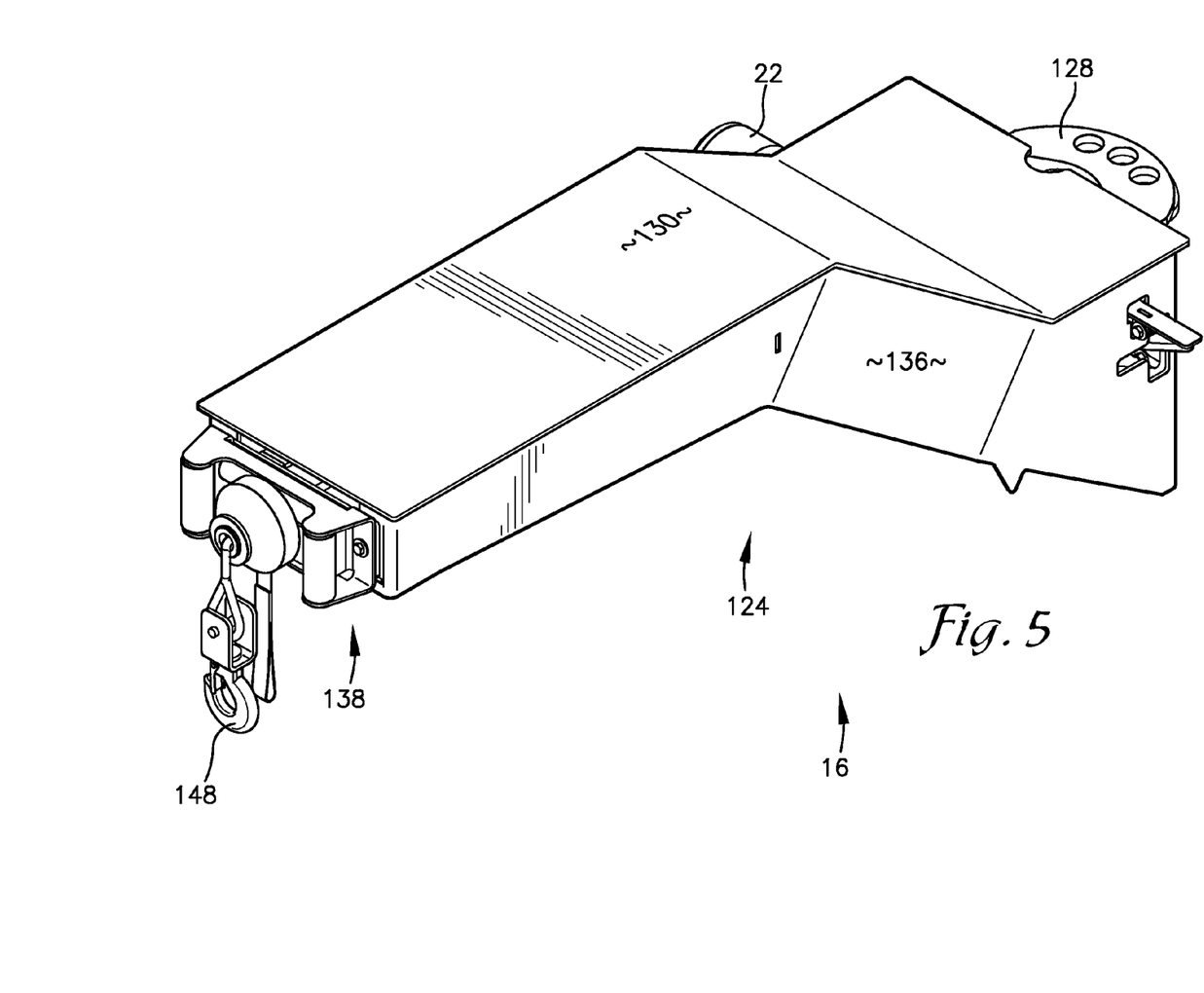
FIG. 5 is a perspective view of a boom of the pivoting winch assembly.
Figure 6:
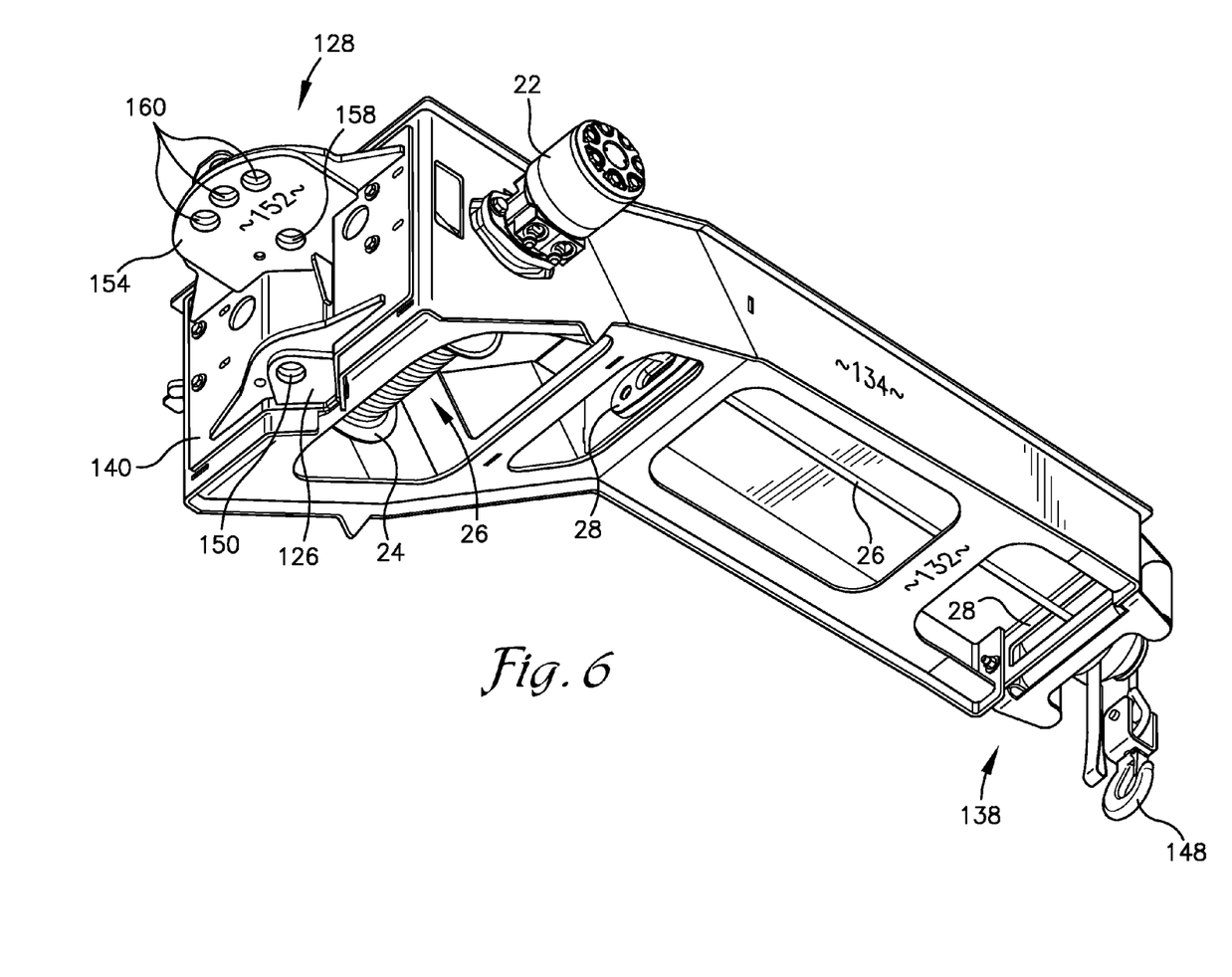
FIG. 6 is a perspective view of the boom as seen from underneath.

Referring to FIGS. 5 and 6, the boom 16 of the winch assembly 12 broadly comprises a boom structure 124, a bottom pivot plate 126, and a top pivot plate 128. In embodiments of the invention, the bottom pivot plate 126 and the top pivot plate 128 of the boom 16 may be strengthened by additional material such as metal components or grommets. The boom structure 124 has a top 130, a bottom 132, a left side 134, a right side 136, a winch opening 138, and a base 140. The base 140 of the boom structure 124 faces the front 48 of the wood chipper 10 and is adjacent to the base 82 of the trunk 74 of the attachment bracket 14. The base 140 is vertically oriented and provides mounting points for the bottom pivot plate 126 and the top pivot plate 128. The winch opening 138 is parallel to and distal from the base 140 of the boom structure 124. As will be discussed later, the winch opening 138 generally faces the rear 46 of the chipper 10.

The top 130, bottom 132, left side 134, and right side 136 of the boom structure 124 extend rearward from the base 140 and generally over the feed horn 32 of the wood chipper 10. The top 130, bottom 132, left side 134, and right side 136 of the boom structure 124 generally intersect at right angles. The top 130, left side 134, and right side 136 of the boom structure 124 each include a first generally horizontal section integrally connected to a diagonally-elongated section integrally connected to a second generally horizontal section. The top 130, left side 134, and right side 136 are solid. The bottom 132 has multiple passageways for access to components inside the boom structure 124. The bottom 132 includes the diagonally-elongated section integrally connected to the second generally horizontal section.

Mounted inside the boom structure 124 are the hydraulic motor 22, the spool 24, the rope 26, and one or more fairleads 28 to direct the rope including one fairlead positioned in the winch opening 138 of the boom structure 124. The hydraulic motor 22 spins the spool 24 to retract the rope 26 and draw in material to the feed horn 32. The spool 24 can be manually spun by a user to extend the rope 26 outward and away from the winch opening 138 and thus the wood chipper 10. The rope 26 is directed from the spool 24, through the fairleads 28 and out the winch opening 138 of the boom structure 124. The rope 26 is extendable from the fairlead 28 in the winch opening 138 outward and away from the boom 16 of the winch assembly 12 to secure material to be drawn to the feed horn 32 of the wood chipper 10. In embodiments of the invention, at the end of the rope 26 is a metal hook 148 of sufficient size and shape to prevent the end of the rope from being retracted past the fairlead 28 in the winch opening 138 and into the boom structure 124. It is appreciated that placement inside the boom structure 124 is for exemplary purposes only. In other embodiments of the invention, the hydraulic motor 22, the spool 24, the rope 26, and one or more of the fairleads 28 may be mounted on the outside of the boom structure 124.

As shown in FIG. 6, the bottom pivot plate 126 of the boom 16 is an oblate semi-arcuate body with attached shoulders. The bottom pivot plate 126 is mounted to the base 140 of the boom structure 124 and extends horizontally towards the attachment bracket 14 in the direction of the front 48 of the wood chipper 10. Centered in the body of the bottom pivot plate 126 is a lower boom opening 150. The lower boom opening 150 is vertically oriented to accept the pivot pin 18.

The top pivot plate 128 of the boom 16 is an oblate body having a first end 152 and a second end 154. The first end 152 is mounted to the base 140 of the boom structure 124. The second end 154 extends horizontally towards the attachment bracket 14 in the direction of the front 48 of the wood chipper 10 and extends horizontally in the direction of the chipper's left 50 and right sides 52. The top pivot plate 128 is mounted a second distance above the bottom pivot plate 126, such that when the boom 16 is mounted to the attachment bracket 14 the second end 154 of the top pivot plate is positioned into the slot 86 of the attachment bracket. Centered in the top pivot plate 128 and proximal to the first end 152 is a upper boom opening 158. The upper boom opening 158 is directly above the lower boom opening 150 in the bottom pivot plate 126 and vertically oriented for acceptance of the pivot pin 18. Proximal to the second end 154 of the top pivot plate 128 are a multitude of secondary openings 160 vertically oriented for receiving the retention pin 20. The holes are aligned about an arcuate path proximal to the second end 154 of the top pivot plate 128 of the boom 16. In embodiments of the invention there are three holes proximal to the second end 154 of the top pivot plate 128 of the boom 16.

The second distance separates the bottom pivot plate 126 and the top pivot plate 128 of the boom 16. As discussed earlier, the first distance separates the bottom pivot plate 102 and the top pivot plate 104 of the attachment bracket 14. The first distance is less than the second distance such that when the attachment bracket 14 is coupled to the boom 16, the bottom pivot plate 126 of the boom 16 is below the bottom pivot plate 102 of the attachment bracket 14, and the top pivot plate 128 of the boom 16 is above the top pivot plate 104 of the attachment bracket 14. The first distance being less than the second distance is for exemplar purposes and in embodiments of the invention the second distance is less than the first distance.

Referring to the attachment bracket 14 discussed earlier, the lower bracket opening 110 in the bottom pivot plate 102 of the attachment bracket 14 and the upper bracket opening 118 in the top pivot plate 104 of the attachment bracket form a set of bracket openings. The second hole in the top pivot plate 104 of the attachment bracket 14 and the hole 122 in the top pivot retention plate 106 of the attachment bracket form a set of retention openings. As noted above, the lower boom opening 150 in the bottom pivot plate 126 of the boom 16 and the upper boom opening 158 in the first end 152 of the top pivot plate 128 of the boom form a set of boom openings. The multitude of secondary openings 160 in the second end 154 of the top pivot plate 128 of the boom 16 form a plurality of secondary openings. It is appreciated that the arrangement of the slot 86, the set of retention openings and the plurality of secondary openings is for illustrative purposes. In embodiments of the invention, the boom has a slot with a set of retention openings and the attachment bracket has a plurality of secondary openings.

Figure 7:
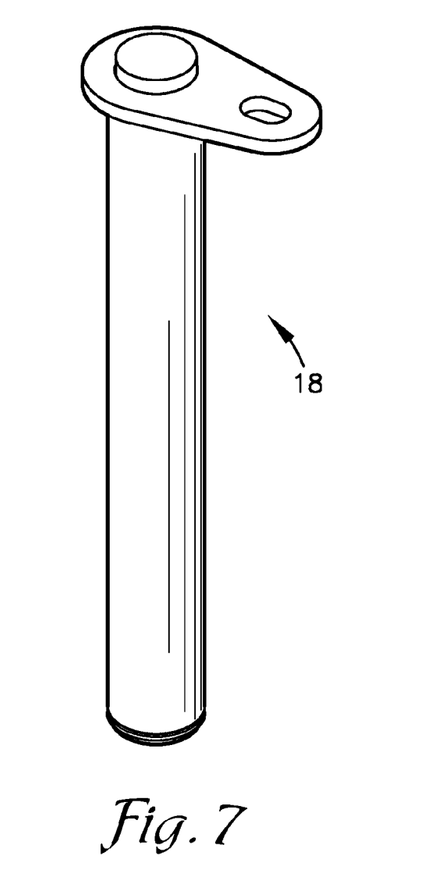
FIG. 7 is a side view of a pivot pin of the pivoting winch assembly.

As shown in FIGS. 7 and 9, the pivot pin 18 of the winch assembly 12 is a rod with a flared disc at the top. The pivot pin 18 is aligned vertically through the set of bracket openings and the set of boom openings to pivotably couple the attachment bracket 14 to the boom 16 of the winch assembly 12. The disc is larger in diameter than the set of bracket openings and the set of boom openings to prevent the pivot pin 18 from falling downward through either set of openings. The pivot pin 18 enables the boom 16 to pivot about the vertical axis of the pivot pin into a plurality of preferred positions with respect to the attachment bracket 14 and thus the wood chipper 10. The plurality of preferred positions includes the following positions with respect to the wood chipper 10: the winch opening 138 of the boom 16 facing the rear 46 of the chipper and the boom parallel with the major axis 54 of the chipper; the winch opening of the boom facing both the rear and the curb side 52 of the chipper and the boom not parallel with the chipper's major axis; the winch opening of the boom facing both the rear and the street side 50 of the chipper and the boom not parallel with the chipper's major axis.

Figure 8:
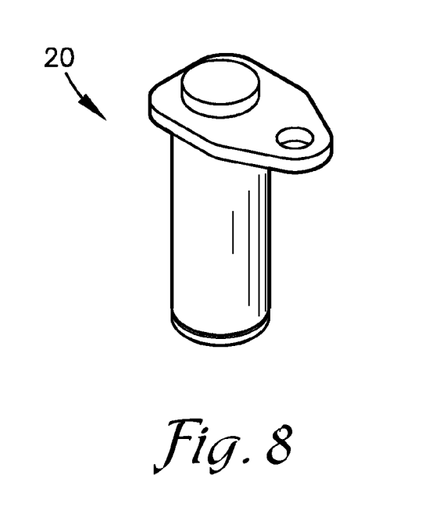
FIG. 8 is a side view of a retention pin of the pivoting winch assembly.

As shown in FIGS. 8 and 9, the retention pin 20 of the winch assembly 12 is a rod with a flared disc at the top. The disc is larger in diameter than the set of retention openings and any of the plurality of secondary openings to prevent the retention pin 20 from falling downward through either set of openings. The retention pin 20 is engaged through the set of retention openings and through one of the plurality of secondary openings to lock the boom 16 into one of the plurality of preferred positions. In detail, as the boom 16 rotates into the plurality of preferred positions the multitude of secondary openings 160 through the arcuate path of the second end 154 of the top pivot plate 128 of the boom align with the set of retention openings in the attachment bracket 14. When the boom 16 is pivoted into one of the plurality of preferred positions the set of retention openings align with one of the plurality of secondary openings. The retention pin 20 is placed through the set of retention openings in the attachment bracket 14 and one of the multitude of secondary openings 160 through the arcuate path of the second end 154 of the top pivot plate 128 of the boom 16 locking the boom into one of the plurality of secondary positions. In embodiments of the invention there are more than three holes along the arcuate path and the plurality of preferred positions is greater than three, respectively.

In embodiments of the invention, the boom and that attachment bracket are pivotably coupled together by a gearset and hydraulic motor (not depicted). The gearset and hydraulic motor allow the boom 16 to pivot into a plurality of preferred positions. The plurality of preferred positions includes the following positions with respect to the wood chipper 10: the winch opening 138 of the boom 16 facing the rear 46 of the chipper and the boom parallel with the major axis 54 of the chipper; the winch opening of the boom facing both the rear and the curb side 52 of the chipper and the boom not parallel with the chipper's major axis; the winch opening of the boom facing both the rear and the street side 50 of the chipper and the boom not parallel with the chipper's major axis.

Having sufficiently described the structure of the winch assembly 12, operation and use will now be discussed in more detail. The user places the wood chipper 10 at a job site where material to be chipped is located. While transported, the retention pin 20 places the boom 16 of the winch assembly 12 parallel to the major axis 54 of the wood chipper 10 with the winch opening 138 of the boom facing the rear 46 of the chipper.

The user tilts the feed table 34 of the feed horn 32 into the horizontal position to receive material to be chipped. The user carries smaller pieces of material to be chipped to the wood chipper 10 and places them by hand into the feed horn 32. The feed system 36 draws the material into the chipping mechanism 42 and the chipping mechanism chips the material. The chipped material is then propelled by the chipping mechanism 42 and directed out the discharge chute 44 and away from the wood chipper 10.

The user encounters a piece of material too large to be loaded by hand that is directly behind the wood chipper 10 and nearly parallel to the major axis 54 of the chipper. The user pulls on the rope 26 and the spool 24 rotates allowing the rope to extend. The user extends the rope 26 to the material and ties the end of the material nearest the chipper 10 with the rope.

The user then instructs the hydraulic motor 22 to spin the spool 24 and retract the rope 26 drawing the material until the material is over the feed table 34 of the feed horn 32. The user then stops the hydraulic motor 22 and the weight of the material pulls against the spool 24 until the material rests on the feed table 34. The user then unties the end of the material and reties the rope 26 to the middle of the material. The user then instructs the hydraulic motor 22 to spin the spool 24 and retract the rope 26. As the winch assembly 12 draws the material into the feed horn 32 the feed horn guides the material into the feed system 36. The user unties the rope from the middle of the material. The user then instructs the hydraulic motor 22 to retract the rope 26 up into the winch opening 138 of the boom 16. Then the feed system 36 begins drawing the material into the wood chipper 10, and the chipping mechanism 42 chips the material.

Next, and referring to FIGS. 10-13, the user encounters a second piece of material too large to be loaded by hand that is directly behind the wood chipper 10 and nearly perpendicular to the major axis 54 of the chipper. This piece of material has a middle section, a first end off to the street side 50 of the wood chipper 10, and a second end off to the curb side 52 of the wood chipper. The user pulls on the rope 26 and the spool 24 rotates allowing the rope to extend. The user extends the rope 26 to the material and ties the rope to the first end of the material.

The user then instructs the hydraulic motor 22 to spin the spool 24 and retract the rope 26. The rope 26 draws the first end of the material towards the feed horn 32 and rotates the material such that it is at an angle with respect to the major axis 54 of the wood chipper 10. The user instructs the hydraulic motor 22 to stop spinning and the weight of the material pulls against the rope 26 and the rope extends until the first end of the material is resting on the feed table 34. The first end of the material is now resting on the feed table 34 and the material is not parallel with the major axis 54 of the wood chipper 10—the second end of the material is off to the curb side 52 of the wood chipper.

The user unties the rope 26 from the first end of the material. The user removes the retention pin 20 from the set of retention openings and the boom 16 of the winch assembly 12 is now freely pivotable. The user then pivots the boom 16 into a preferred position such that the winch opening 138 is directed to the rear 46 and the street side 50 of the wood chipper 10. The user then places the retention pin 20 into the set of retention openings and one of the plurality of secondary openings. The boom 16 is now locked into the preferred position where the winch opening 138 is directed to the rear 46 and the street side 50 of the wood chipper 10.

The user extends the rope 26 by hand and ties the rope to the second end of the material. The user then instructs the hydraulic motor 22 to spin the spool 24 and pull against the material. The preferred position of the boom 16 is on the opposite side of the major axis 54 of the wood chipper 10 from the second end of the material. As the rope 26 pulls against the second end of the material, the material rotates and the material becomes more parallel to the major axis 54 of the wood chipper 10.

When the material is generally parallel with the major axis of the wood chipper 10 the user instructs the hydraulic motor 22 to stop spinning. The user then removes the retention pin 20 and pivots the boom 16 until the winch opening 138 is directed to the rear 46 of the wood chipper 10. The user then places the retention pin 20 into the set of retention openings and one of the plurality of secondary openings. The boom 16 is now locked into the preferred position where the boom is parallel to the major axis 54 of the wood chipper 10. The user then instructs the hydraulic motor 22 to spin the spool 24 and draw the material into the feed horn 32. The feed horn 32 guides the material into the feed system 36. The user unties the rope 26 from the material to be chipped. The use then instructs the hydraulic motor 22 to retract the rope 26 up into the winch opening 138 of the boom 16. Then the feed system 36 begins drawing the material into the wood chipper 10, and the chipping mechanism 42 chips the material.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A pivotable winch assembly configured to be secured to a wood chipper, the wood chipper including a frame and a feed horn, said feed horn having an opening that faces towards a rear end of the wood chipper, the pivotable winch assembly comprising:

a winch for drawing material towards and into the wood chipper;

an attachment bracket configured to be permanently coupled to the wood chipper, wherein the attachment bracket has an end, the end facing the rear end of the wood chipper, wherein the end of the attachment bracket has a set of bracket openings and a set of retention openings;

a boom having a first end pivotably coupled to the attachment bracket and a second end for directing the winch with respect to the wood chipper, wherein the second end is configured to elongate upwards over the feed horn and outwards substantially towards the rear end of the wood chipper, wherein the first end of the boom has a set of boom openings and a plurality of secondary openings;

a pivot pin extending vertically through the set of bracket openings and the set of boom openings, said pivot pin enabling the boom to pivot freely about the vertical axis of the pivot pin into a plurality of preferred positions; and a retention pin extending vertically through the attachment bracket and the boom, said retention pin enabling the boom to be fixed into one of the plurality of preferred positions by being placed in one of the plurality of secondary openings.

2. The pivotable winch assembly of claim 1, further comprising:
   a rope attached to the winch configured to draw material towards the feed horn of the wood chipper;
   a winch opening at said second end of said boom and facing the rear of the wood chipper;
   wherein said boom is hollow providing a chamber in which to mount the winch; and
   a passageway connecting the chamber to the winch opening,
   said passageway configured to direct the rope from the winch through the boom and out the winch opening.

3. The pivotable winch assembly of claim 1, wherein said set of bracket openings comprises a pair of bracket openings,
   said pair of bracket openings are a first distance from each other; and
   wherein said set of boom openings comprises a pair of boom openings,
   said pair of boom openings are a second distance from each other,
   wherein said first distance is greater than said second distance.

4. The pivotable winch assembly of claim 1, wherein said set of bracket openings comprises a pair of bracket openings,
   said pair of bracket openings are a first distance from each other; and
   wherein said set of boom openings comprises a pair of boom openings,
   said pair of boom openings are a second distance from each other,
   wherein said second distance is greater than said first distance.

5. The pivotable winch assembly of claim 1, wherein said plurality of secondary openings comprises three openings.

6. The pivotable winch assembly of claim 1, wherein said plurality of secondary openings comprises five openings.

7. The pivotable winch assembly of claim 1, wherein said attachment bracket is configured to be mounted to the frame of the wood chipper.

8. The pivotable winch assembly of claim 1, wherein said attachment bracket is configured to be mounted to a feed system of the wood chipper.

9. A pivotable winch assembly configured to be secured to a wood chipper, the wood chipper including a front end, a rear end, a left side, a right side, and a major axis that extends horizontally from the front end to the rear end, the wood chipper also including a feed horn with an opening, the opening facing towards the rear end of the wood chipper, the pivotable winch assembly comprising:
   a winch for drawing material towards and into the wood chipper;
   an attachment bracket permanently coupled to the wood chipper, wherein the attachment bracket has an end, the end facing the rear end of the wood chipper,
   wherein the end of the attachment bracket has a set of bracket openings and a set of retention openings;
   a boom having a first end pivotably coupled to the attachment bracket and a second end for directing the winch with respect to the wood chipper, wherein the second end is configured to elongate upwards over the feed horn and outwards substantially towards the rear end of the wood chipper,
   wherein the first end of the boom has a set of boom openings and a plurality of secondary openings
   a pivot pin extending vertically through the set of bracket openings and the set of boom openings, said pivot pin enabling the boom to pivot about the vertical axis of the pivot pin into a plurality of preferred positions with respect to the wood chipper; and
   a retention pin extending vertically through the set of retention openings and one of the plurality of secondary openings for securing the boom into said plurality of preferred positions,
   wherein said plurality of preferred positions include the following:
      said boom is substantially parallel with the major axis of the wood chipper,
      said boom is not substantially parallel with the major axis of the wood chipper, and the second end of said boom is facing both the left side and the rear end of the wood chipper,
      said boom is not substantially parallel with the major axis of the wood chipper, and the second end of said boom is facing both the right side and the rear end of the wood chipper.

10. The pivotable winch assembly of claim 9, wherein said set of bracket openings comprises a pair of bracket openings,
    said pair of bracket openings are a first distance from each other; and
    wherein said set of boom openings comprises a pair of boom openings,
    said pair of boom openings are a second distance from each other,
    wherein said first distance is greater than said second distance.

11. The pivotable winch assembly of claim 9, wherein said set of bracket openings comprises a pair of bracket openings,
    said pair of bracket openings are a first distance from each other; and
    wherein said set of boom openings comprises a pair of boom openings,
    said pair of boom openings are a second distance from each other,
    wherein said second distance is greater than said first distance.

12. The pivotable winch assembly of claim 9, wherein said attachment bracket is configured to be mounted to the frame of the wood chipper.

13. The pivotable winch assembly of claim 9, wherein the attachment bracket is configured to be mounted to a feed system of the wood chipper.

14. A method for feeding wood into a wood chipper, the wood chipper having a front end, a rear end, a left side, a right side, and a feed horn located at the rear end with an attached feed table extending horizontally away from the rear end of the wood chipper, the wood chipper also having a major axis that extends horizontally from the front end to the rear end of the wood chipper, the wood chipper further having a pivotably attached winch assembly including an attachment bracket, a boom, and a retention pin, the boom having a winch and a rope, the winch assembly extending above the feed horn and substantially towards the rear end of the wood chipper, the boom of the winch assembly pivots about a vertical axis and is operable into a plurality of preferred positions such that the boom is substantially parallel with the major axis of the wood chipper, the boom is angled to the left of the major axis of the wood chipper, or the boom is angled to the right of the major axis of the wood chipper, the method comprising the following steps:
    acquiring the wood chipper;
    selecting a piece of wood to be chipped, said wood located behind the wood chipper and to one side of the major axis of the wood chipper, said wood having a first end and a second end;

removing, by a user, the retention pin from said pivotably attached winch assembly such that the boom is free to pivot into any one of the plurality of preferred positions;

pivoting, by the user, the boom into a preferred position such that the boom is angled to the same side of the major axis of the wood chipper as is said piece of wood;

inserting, by the user, the retention pin into the winch assembly to secure the boom in said preferred position;

extending the rope to wood to be chipped, the wood having a first end and a second end;

attaching, by the user, the rope to said wood near the first end;

retracting, by the winch, the rope such that the rope draws the first end of said wood towards the feed horn of the wood chipper, wherein the location of the winch assembly above the feed horn positions the first end of said wood over the feed table of the feed horn.

15. The method of claim 14, wherein the second end of said wood is located to one side of the wood chipper's major axis, further comprising the following steps:

extending the rope such that said first end of said wood is lowered onto the feed table of the feed horn;

disconnecting, by the user, the rope of the winch assembly;

removing, by the user, the retention pin such that the boom is free to pivot into any one of the plurality of preferred positions;

pivoting, by the user, the boom into a preferred position such that the boom is located to the opposite side of the wood chipper's major axis from the second end of said wood;

inserting, by the user, the retention pin into the winch assembly to secure the boom into said preferred position;

extending the rope to the second end of said wood;

attaching, by the user, the rope to said wood near the second end; and retracting, by the winch, the rope such that the rope rotates said wood parallel with the wood chipper's major axis.

16. The method of claim 15, further comprising the following steps:

removing, by the user, the retention pin such that the boom is free to pivot into any one of the plurality of preferred positions;

pivoting, by the user, the boom into a preferred position such that the boom is substantially parallel with the major axis of the wood chipper;

inserting, by the user, the retention pin into the winch assembly to secure the boom in said preferred position;

retracting, by the winch, the rope such that the rope draws the wood into the feed horn of the wood chipper.

* * * * *